(12) United States Patent
Holemans et al.

(10) Patent No.: US 11,267,591 B2
(45) Date of Patent: Mar. 8, 2022

(54) SYSTEM AND METHOD TO ATTACH AND REMOVE SPACE VEHICLES

(71) Applicant: Planetary Systems Corporation, Silver Spring, MD (US)

(72) Inventors: Walter Holemans, Washington, DC (US); Ryan Williams, San Diego, CA (US)

(73) Assignee: Planetary Systems Corporation, Silver Spring, MD (US)

( * ) Notice: Subject to any disclaimer, the term of this patent is extended or adjusted under 35 U.S.C. 154(b) by 366 days.

(21) Appl. No.: 16/511,864

(22) Filed: Jul. 15, 2019

(65) Prior Publication Data

US 2020/0017243 A1 Jan. 16, 2020

Related U.S. Application Data

(60) Provisional application No. 62/698,380, filed on Jul. 16, 2018.

(51) Int. Cl.
  *B64G 1/64* (2006.01)
  *B64G 1/10* (2006.01)

(52) U.S. Cl.
  CPC .............. *B64G 1/641* (2013.01); *B64G 1/10* (2013.01)

(58) Field of Classification Search
  CPC .......... B64G 1/641; B64G 1/10; B64G 1/428; B64G 1/44; B64G 2001/643
  See application file for complete search history.

(56) References Cited

U.S. PATENT DOCUMENTS

| | | | | |
|---|---|---|---|---|
| 5,129,601 A * | 7/1992 | Henkel | ................. | B64G 1/222 124/1 |
| 5,522,569 A * | 6/1996 | Steffy | ................... | B64G 1/641 244/158.1 |
| 8,550,408 B2 * | 10/2013 | Ross | ..................... | B64G 1/641 244/173.1 |

* cited by examiner

*Primary Examiner* — Valentina Xavier
(74) *Attorney, Agent, or Firm* — Robert M. McDermott

(57) ABSTRACT

A system and method for installing, deploying, and recovering a plurality of spacecraft that provides an ease of use and structural stability, and facilitates a standardization of spacecraft design. In embodiments of this invention, threaded rods are arranged orthogonal to a surface of a baseplate, and each spacecraft includes a coupling mechanism that selectively engages or disengages each threaded rod. Each spacecraft is added to the stack by engaging its coupling mechanism and rotating the threaded rods while the preceding spacecraft on the stack disengage their coupling mechanisms, thereby enabling the spacecraft to travel along the threaded rods toward the baseplate. When all of the spacecraft are added to the stack, the stack is preloaded by rotating the treaded rods into a terminator component at the top of the stack while the coupling mechanisms in all of the spacecraft are disengaged. Spacecraft are deployed by reversing the process.

25 Claims, 7 Drawing Sheets

SYSTEM AND METHOD TO ATTACH AND REMOVE SPACE VEHICLES

This application claims the benefit of U.S. Provisional Patent Application 62/698,380, filed 16 Jul. 2018.

BACKGROUND AND SUMMARY OF THE INVENTION

This invention relates to the field of space craft, and in particular to a system and method for attaching multiple space vehicles to a launch vehicle, deploying the space vehicles, and recovering other space vehicles.

To reduce the cost of space vehicle deployment, and in particular small spacecraft (e.g. under 500 pounds), the U.S. Department of Defense (DoD), NASA, other government agencies, commercial companies, and several universities developed the EELV (Evolved Expendable Launch Vehicle) Secondary Payload Adapter (ESPA), which enables multiple small spacecraft to be launched from ATLAS V, Falcon 9, and other launch vehicles. Other standards for multi-satellite payloads are also available, such as Loadpath's Cubestack, SSO-A's Multi Payload Carrier and Hub, and others, each with particular advantages and disadvantages. For ease of explanation and understanding, the EELV-ESPA standard is used herein to provide a contrast to embodiments of this invention.

FIGS. 1A-1C illustrate an example EELV Secondary Payload Adapter. The adapter 100 is cylindrical, and includes six ports 110, each with an attachment flange 120. Each spacecraft 150 has a mating attachment flange 130. Each spacecraft 150 is coupled to the adapter 100 by coupling the attachment flanges 120, 130. This coupling may be accomplished using a motorized LightBand 140 (U.S. Pat. Nos. 6,227,493; 6,343,770; 6,390,416) from Planetary Systems, Inc., which is tightened around the circumference of the joined flanges 120-130. Deployment after launch is accomplished by loosening the LightBand 140.

As illustrated in FIG. 1B, the individual spacecraft can be different in size and shape, provided they conform to an overall envelope and include the appropriate flange 130. As illustrated in FIG. 1C, the adapter 100 is designed to be situated concentric with the vertical axis 182 of the launch vehicle 180, and multiple adapters 100 can be stacked within the launch vehicle 180, again, for example, using a LightBand to couple the adapters 100.

Although the ESPA provides a standard architecture for designing the spacecraft interface to the launch vehicle and enables multiple spacecraft to be launched from a single launch vehicle, it is not particularly efficient in volume and weight.

As illustrated in FIGS. 1B and 1C, a significant amount of volume is wasted between the vehicles 150, and between the vehicles 150 and the fairing 185 of the launch vehicle. In a typical configuration, the volume efficiency (volume of spacecrafts/available payload volume) can be as low as 50%.

Because the adapter 100 must support the attached spacecraft with minimal movement during launch, its weight can range from 400 pounds to over 600 pounds. The fairing 185 surrounding the spacecraft of each adapter can amount to well over 1000 pounds. In a typical configuration, the mass efficiency (mass of spacecraft/launch vehicle capacity) rarely exceeds 50% due to the mass of the adapter, fairing, and other 'overhead' items.

Another problem with the ESPA architecture is the creation of convoluted load paths, as illustrated by the arrows 190 in FIG. 1C, which lead to potentially large deflections 195 that are difficult to prevent without adding substantial mass to the supporting elements. The potentially large deflections 195 also necessitates constraints on the spacecraft's dynamic envelope, to avoid collisions between spacecraft during launch.

Additionally, the ESPA architecture does not provide a means to control the deployment of the spacecraft. When the launch vehicle is in the proper deployment location, after the fairing has been released, the coupling between the flanges 120-130 is released and the space vehicle 'tumbles away' until its internal navigation and propulsion systems direct it to its proper station.

U.S. Pat. No. 5,522,569, issued 4 Jun. 1996, to Steffy et al. discloses a "SATELLITE HAVING A STACKABLE CONFIGURATION" that provides mass and volume efficiency, with a simplified load path. Relatively short cylindrical satellites of the same diameter are stacked and bolted to each other using three coupling devices arranged on the perimeter of each satellite. The bolts are secured using separation nuts that release the bolts for deployment; a spring mechanism in each coupling device propels the top-most satellite away from the stack. The bolting of each satellite to each other, and the lowermost satellite in the stack to the launch vehicles, provides a self-supporting structure with linear loading, with each set of couplers being preloaded (torqued) to minimize deflection of the stack. However, this self-supporting structure is particularly well suited for uniformly short cylindrical satellites, but if a tall satellite is included in the stack, the wall structure of the tall satellite would need to be sufficiently reinforced to avoid unwanted stack deflection.

U.S. Pat. No. 5,129,601, issued 14 Jul. 1992, to Henkel, discloses a "JACK SCREW PAYLOAD DEPLOYMENT SYSTEM" that uses a set of three motor-driven screws on a baseplate that is attached to the launch vehicle. The motor-driven screws are threaded into attachment fittings (nuts) on the space vehicle to attach the space vehicle to the baseplate. By unscrewing the screws at a predetermined speed, the space vehicle can be 'launched' from the baseplate at a desired velocity. However, this arrangement is a single space vehicle deployment system, because once the space vehicle is screwed down to the baseplate, the screws cannot be further rotated to accept other space vehicles. If multiple space vehicles are threaded onto the screws sequentially, the screws will again cease rotation when the lower space vehicle reaches the baseplate, preventing the preloading (torqueing) of the upper space vehicles, rendering the stack unstable for launch.

It would be advantageous to provide a system and method for installing, deploying, and recovering a plurality of spacecraft that provides an ease of use and structural stability that is not currently available in existing spacecraft deployment systems. It would be of further advantage to provide a system and method that supports a standardization of spacecraft design that enables spacecraft from different sources to be efficiently arranged within the launch vehicle.

These advantages, and others, can be realized by defining a standard, or family of standard dimensions for the exterior shape of each spacecraft, with well defined placement of internal structures that facilitate the coupling of multiple spacecraft in a stack above a baseplate that is configured to be fixedly attached to the launch vehicle.

In an embodiment of this invention, a plurality of threaded rods are arranged orthogonal to a surface of the baseplate, and each spacecraft includes a channel through which each rod can traverse. Each spacecraft also includes a coupling mechanism that selectively engages or disengages each threaded rod. Each spacecraft is added to the stack by engaging its coupling mechanism while each of the preceding spacecraft disengages its coupling mechanism. When the coupling mechanism is engaged and the threaded rods are rotated, the spacecraft travels along the threaded rods toward the baseplate; when the coupling mechanism is disengaged, the threaded rod is free to rotate. When all of the spacecraft are added to the stack, the threaded rods engage a terminator component, which may be the nosecone of the launch vehicle, and are rotated while the coupling mechanisms in all of the spacecraft of the stack are disengaged. The threaded rods are screwed into the terminator component, thereby preloading the stack to the baseplate to withstand the loads introduced during launch.

To deploy the spacecraft from the launch vehicle, the process is reversed. The terminator component is released by unscrewing the threaded rods while the coupling mechanisms of all of the spacecraft are disengaged. Upon release of the terminator component, the uppermost spacecraft in the stack engages its coupling mechanisms, thereby enabling the spacecraft to travel along the threaded rods, away from the baseplate, when the threaded rods are further rotated. Each subsequent spacecraft is similarly ejected by engaging its coupling mechanisms as the threaded rods are rotated.

The spacecraft deployment system of this invention may also be used to retrieve spacecraft, thereby reducing the amount of 'space junk' that remains in orbit after the spacecraft has completed its mission. In such an embodiment, the remainder portion of the launch vehicle with the baseplate and threaded rods is directed to the spacecraft that is to be retrieved. The threaded rods enter the channels of the spacecraft, and the spacecraft engages its coupling mechanisms to travel along the threaded rods, toward the baseplate, when they are rotated. As each subsequent spacecraft is engaged, the spacecraft on the stack disengage their coupling mechanisms to enable the threaded rods to rotate. If the nosecone is available for retrieval, it is retrieved and used as the terminator component to preload the stack for re-entry; otherwise, the topmost spacecraft may engage its coupling mechanism to serve as the terminator component.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Additionally, for purposes of explanation, the following terms are used herein, with accompanying explanation. These explanations are provided for ease of understanding, and are not intended to limit the claimed invention beyond the limits expressly included in the claims.

Actuator: a mechanical device for moving or controlling another device.

Baseplate: a lowest structure in the stack of spacecraft, configured to be fixedly attached to the launch vehicle.

Bolt: a rod with a helical thread.

Coupling mechanism: a structure that is able to selectively join the spacecraft to a rod.

Launch vehicle: a rocket used to launch spacecraft.

Nosecone: a protective cone constituting the forward end of a launch vehicle.

Nut: a device with an internal thread that engages the thread of a bolt; as used herein, the nut need not completely encircle the bolt.

Pinion: a gear with teeth designed to mesh with a larger wheel or rack.

Preload: application of stress to a mechanical system; as used herein, a compression force to increase the rigidity of the stack of spacecraft.

Rack: a bar with teeth for operating with a pinion or worm gear to transform rotary motion to linear motion or vice versa.

Rod: a straight slender bar.

Stack of spacecraft: a plurality of spacecraft arranged vertically above a baseplate.

Spacecraft: a vehicle or device designed for travel or operation outside the earth's atmosphere.

Terminator component: a topmost structure in the stack of spacecraft, configured to preload the stack to the baseplate.

Threaded rod: a rod with a plurality grooves or one or more helical grooves.

Figure 1A:
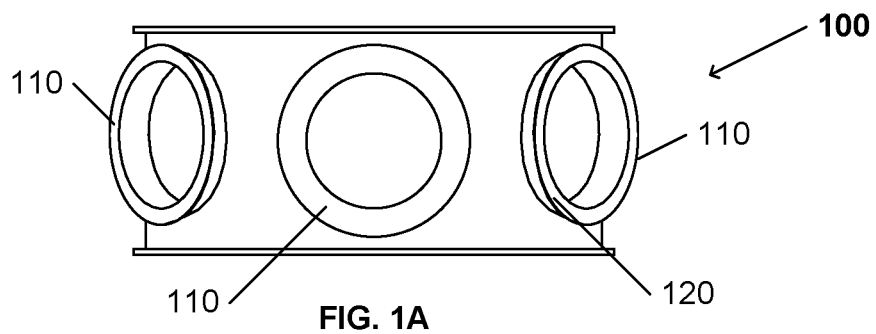
FIGS. 1A-1C illustrate an example prior art spacecraft deployment system.
Figure 1B:
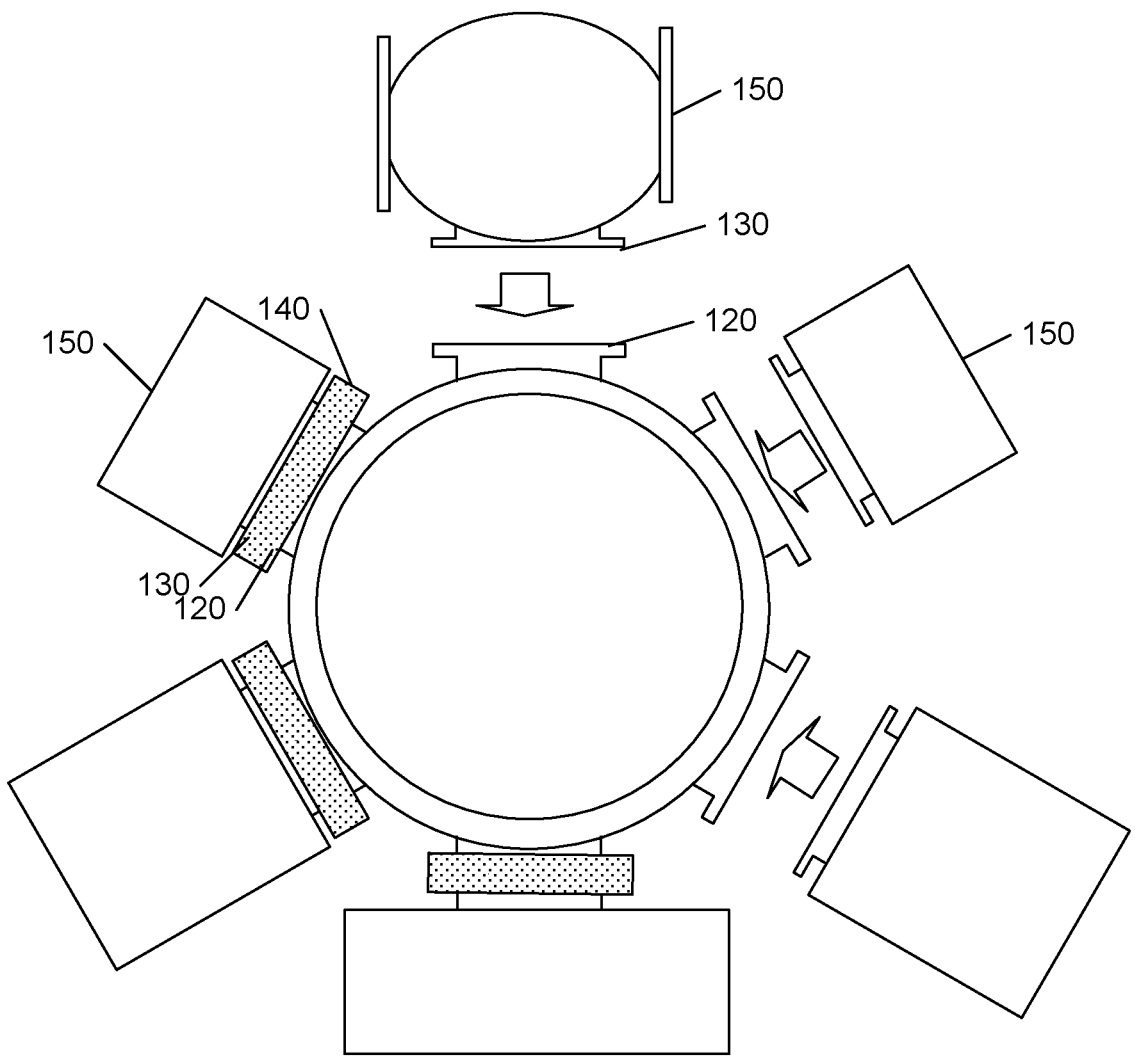
Figure 1C:
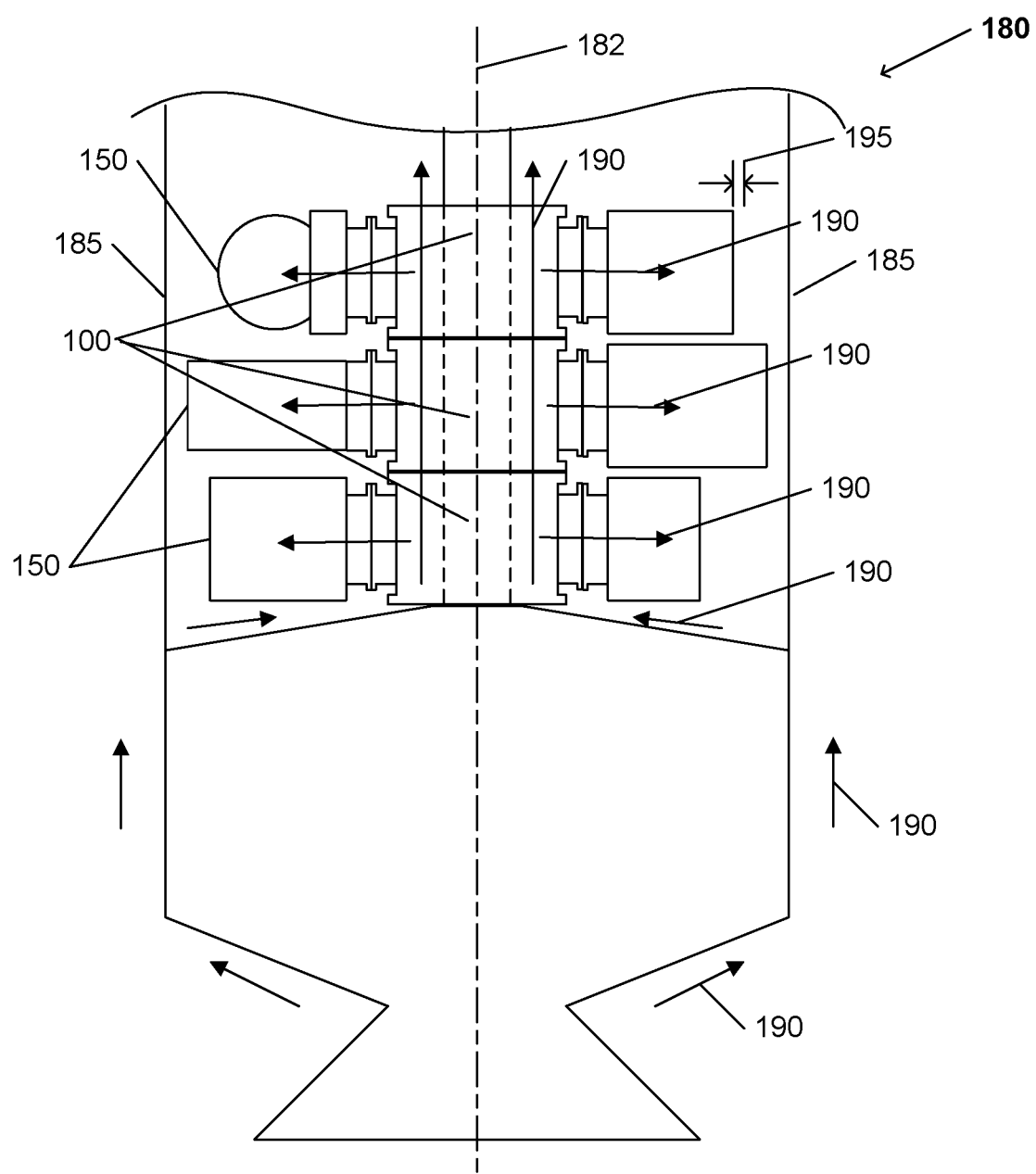
Figure 2:
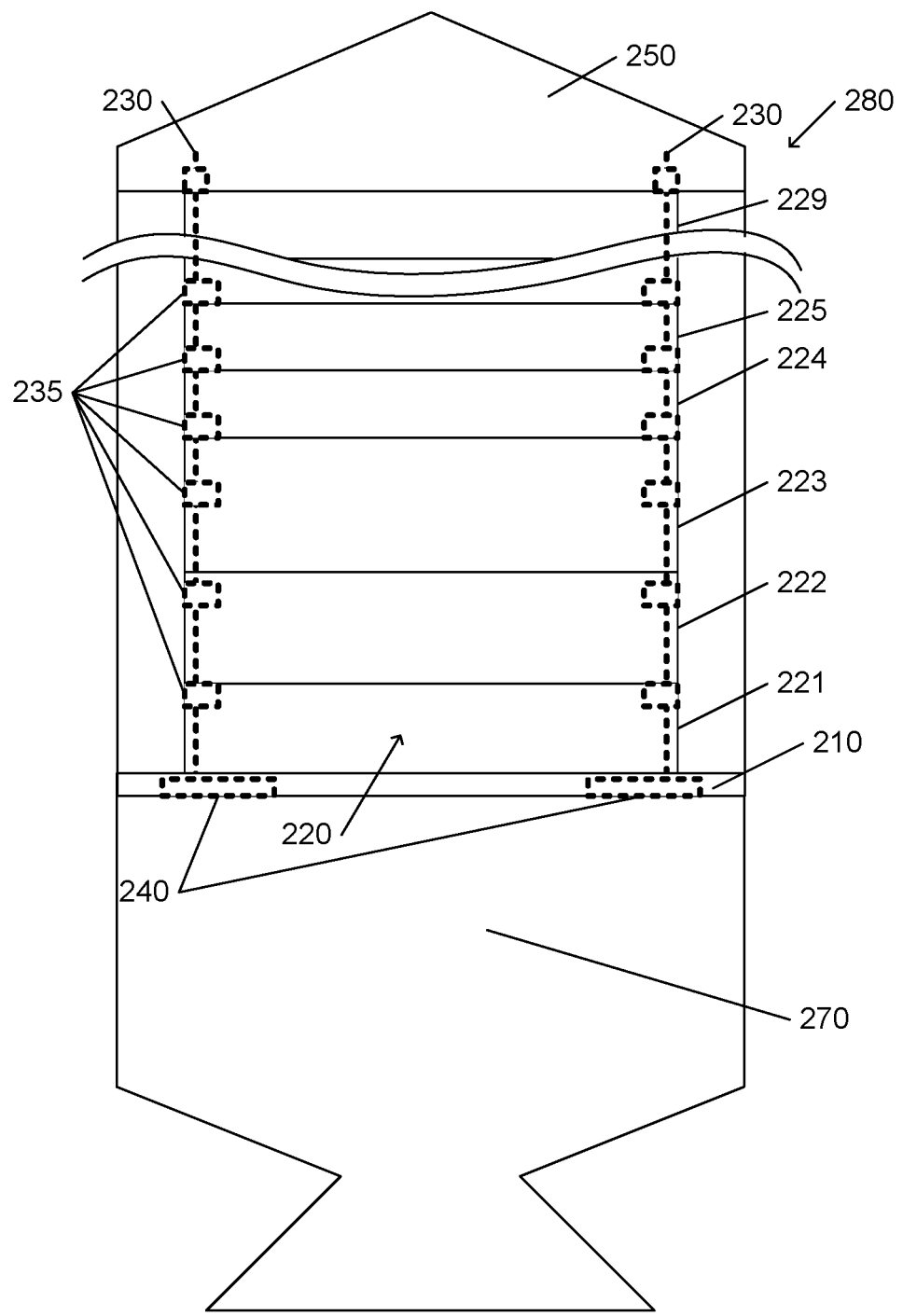
FIG. 2 illustrates an example spacecraft deployment system using aspects of this invention.

FIG. 2 illustrates an example embodiment of a spacecraft deployment system that uses aspects of this invention. In this embodiment, a stack 220 of spacecraft 221-229 is situated upon a baseplate 210 that is fixedly attached to the final stage 270 of a launch vehicle 280. Threaded rods 230 extend through channels (330 in FIGS. 3A-3B) in each spacecraft 221-229, and into a terminator component 250, which is illustrated as the nosecone of the launch vehicle 280. One of skill in the art will recognize that the terminator component 250 may be any component that receives and captures the terminal end of the threaded rods 230. Optionally, protective elements, such as O-rings, EMI gaskets, etc. may be placed between the spacecraft 221-229.

Each spacecraft 221-229 includes coupling mechanisms 235 that selectively engage or disengage the threaded rods 230. When the coupling mechanisms 235 of a spacecraft are engaged, the rotation of the threaded rods 230 cause the spacecraft to travel along the threaded rods 230, either toward the baseplate 210 for adding the spacecraft to the stack 220, or away from the baseplate 210 for removing the spacecraft from the stack 220.

In the example of FIG. 2, each threaded rod 230 is driven by an actuator 240 that selectively rotates the rod 230. Each actuator 240 of the stack is synchronized with each other actuator 240 so that the spacecraft moves uniformly along each threaded rod 230 when its coupling mechanisms 235 are engaged. The coupling mechanisms 235 of each spacecraft are similarly synchronized to uniformly engage or disengage the threaded rods 230.

As noted above, each spacecraft 221-229 is added to the stack by situating the rods 230 into channels of the spacecraft and enabling the coupling mechanisms of the spacecraft to engage the threaded rods 230. The channels may be flared at the bottom of the spacecraft to facilitate the entry of the rods 230 into the channels. While the coupling mechanism 235 of the spacecraft to be added is engaged, the coupling mechanisms of all spacecraft currently on the stack are disengaged from the threaded rods 230, allowing the threaded rods 230 to rotate, thereby propelling the spacecraft along the threaded rods 230 toward the baseplate 210.

Optionally, if the spacecraft is being added to the stack using a crane or other supporting mechanism, the spacecraft's coupling mechanisms may be disengaged and the crane may lower the satellite onto the existing stack. Threading the spacecraft onto the existing stack is generally preferred in order to avoid the complexities of a controlled uniform lowering of the spacecraft, particularly if the tolerance between the rods and the channels of the spacecraft is tight. Threading the spacecraft onto the existing stack also allows the crane to remove the mechanism to lift the spacecraft, before the spacecraft is in contact with the stack.

By arranging the spacecraft 221-229 in a vertical stack, the load path is along the rods 230 and the accompanying channels 330 in each spacecraft. This vertical loading substantially reduces the complexity of load management as discussed above with respect to prior art ESPA system, as well as substantially reducing the potential deflection 195 of the ESPA deployment system. Also as compared to the ESPA deployment system, the volume consumed by each spacecraft is substantially reduced, as well as the volume required to accommodate the supporting adapter 100. This reduction in volume allows for smaller and/or shorter launch vehicle fairings and/or larger spacecraft volume.

In preparation for launch, the stack is preloaded by rotating the threaded rods into the terminator component at the top of the stack. In an embodiment of this invention, the threaded rods may be ⅜" steel rods, and are torqued to produce a preload of at least 5,000 lbf. to minimize movement of the stack during launch. If the terminator component is in the nosecone 250, the nosecone 250 may be configured to have a 'lip' within which the fairing fits, with a corresponding lip at the top of the final stage 270. In this manner, panels of the fairing may be situated within the lip of the final stage 270, and extends into the lip of the nosecone 250 as the nosecone 250 is drawn down upon the threaded rods 230. When the nosecone 250 is subsequently unscrewed from the threaded rods 230 during deployment, the panels of the fairing may simply 'fall away' from the final stage 270.

To deploy the spacecraft 221-229 after launch, all of the coupling mechanisms of the spacecraft 221-229 are disengaged and the actuators 240 are enabled to unscrew the threaded rods 230 from the terminator component 250. Thereafter, the uppermost spacecraft on the stack 220 engages its coupling mechanism and the actuators are enabled to unscrew the spacecraft from the stack. The deployment velocity of the spacecraft may be precisely controlled by controlling the rotation speed of the threaded rods 230, and higher velocities may be achieved compared to conventional spring-loaded deployments. Additionally, by projecting the spacecraft from the threaded rods 230, the likelihood or degree of tumbling is substantially reduced.

Although the spacecraft will typically be deployed individually, multiple spacecraft may be released in quick sequence by initially creating a space between the spacecraft, then simultaneously engaging each of the coupling mechanisms of each of the multiple spacecraft. Alternatively, the multiple spacecraft could be deployed by sequencing the engagement of each spacecraft without waiting for the upper spacecraft to be completely deployed from the threaded rods 230.

After deploying all of the spacecraft from the stack, the deployment system may be used to retrieve other spacecraft by guiding the threaded rods 230 into the channels of the retrieved spacecraft and using the techniques detailed above to create a stack of satellites atop the baseplate 210. If the nosecone 250 is accessible, it can be used as the terminator component to secure the stack for re-entry; otherwise, the uppermost spacecraft may engage its coupling mechanism 235 to serve as the terminator component.

Figure 3A:
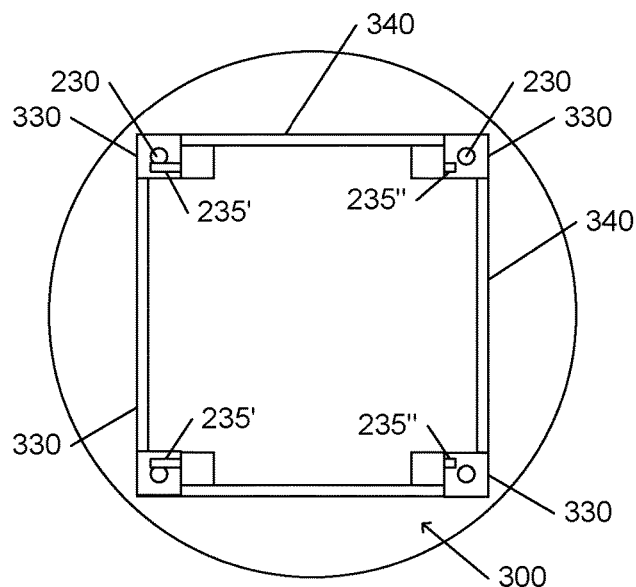
FIGS. 3A-3B illustrate an example rectilinear spacecraft using aspects of this invention.
Figure 3B:
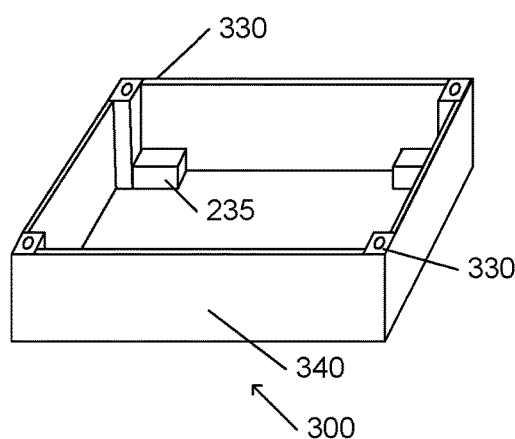

FIGS. 3A-3B illustrate an example embodiment of a spacecraft 300 using aspects of this invention. In this example, the spacecraft 300 is square, with a channel 330 in each of the four corners of the spacecraft. Each channel 330 allows the threaded rod 230 to traverse through the spacecraft 300. The channels 330 are structured to provide support to the stack when the threaded rods 230 are attached to the terminator component and preloaded. The side panels 340 provide reactive forces to shear forces during launch to minimize potential rotational deflection of the stack.

FIG. 3A illustrates coupling mechanisms 235', 235" that selectively engage or disengage the threaded rods 230. Although all of the coupling mechanisms 235 of a spacecraft would be concurrently engaged or disengaged, the coupling mechanisms 235' are illustrated in the engaged state, while the coupling mechanisms 235" are illustrated in the disengaged state for ease of understanding. Although the channels 330 are illustrated as being 'closed' structures, one of skill in the art will recognize that the channels 330 may only partially enclose the rods 230, to facilitate engagement by the coupling mechanisms 235.

Although the spacecraft of FIGS. 3A, 3B has a square shape with four threaded rods 230, one of skill in the art will recognize that other shapes may be used, with a corresponding increase or decrease in the number of threaded rods 230. If the spacecraft is a polyhedron, the rods will generally be placed at the vertices. In general, the number of rods will increase with the size and mass of the spacecraft, and the number of sides will determine the volumetric efficiency by reducing the 'empty space' between the perimeter of the spacecraft and the fairing of the launch vehicle 280. However, a square shape may be preferred because most subsystem components of a spacecraft are rectangular.

One of skill in the art will also recognize that additional rods that are only threaded to couple to the terminator component 250 may be used for preloading the stack. In such a configuration, the threaded rods 230 may be used only to transfer the spacecraft onto or off the stack 220.

If only one threaded rod 230 is used, it may be preferably located at the center of the stack of spacecraft 220. This single threaded rod configuration has the advantage that each spacecraft need only have one coupling mechanism 235, and the need to synchronize multiple coupling mechanisms 235 in the spacecraft is eliminated. If the threaded rod 230 is at the center of the stack, however, the coupling mechanism 235 and space for the threaded rod 230 need to be in the center of the spacecraft, which may complicate the configuration of the mission-specific components in the spacecraft.

Figure 4:
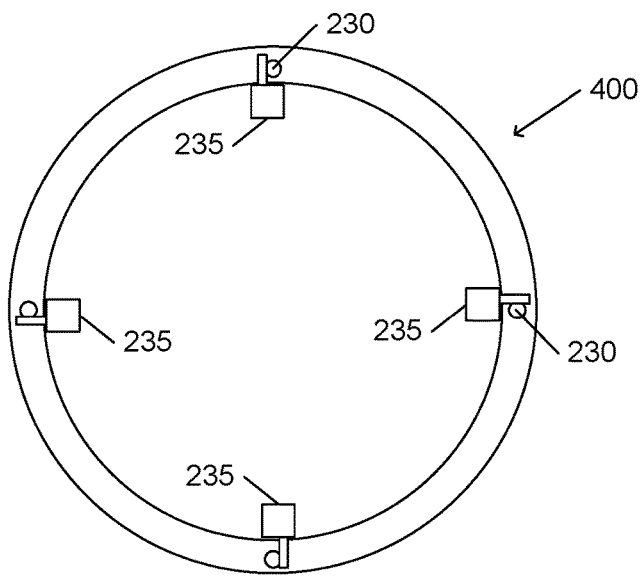
FIG. 4 illustrates an example cylindrical spacecraft using aspects of this invention.

FIG. 4 illustrates an alternative embodiment, wherein the spacecraft 400 is cylindrical, and may form the fairing of the launch vehicle 280, thereby optimizing the available volume. In this example, the cylindrical walls of the spacecraft provide the channels (not illustrated) for the threaded rods 230, or for additional rods that are only threaded to couple to the terminator component 250. The threaded rods 230 are preferably arranged symmetrically about the perimeter of the spacecraft, as are the additional rods, if any.

Figure 5A:
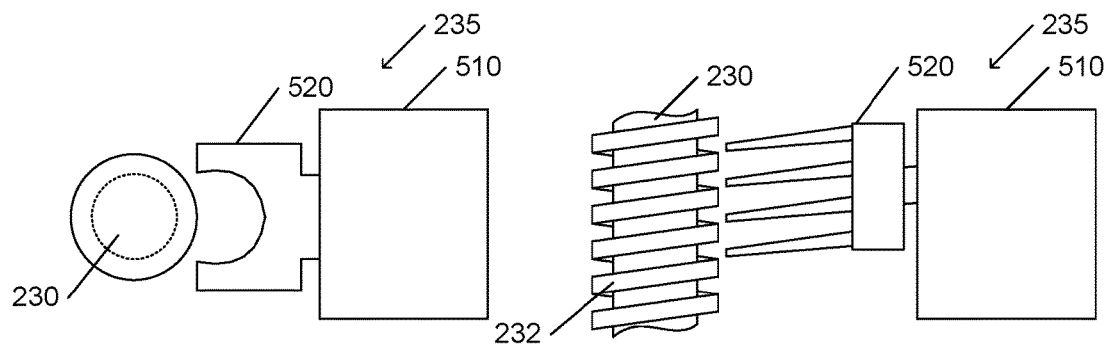
FIGS. 5A-5B illustrate an example coupling mechanism using aspects of this invention.
Figure 5B:
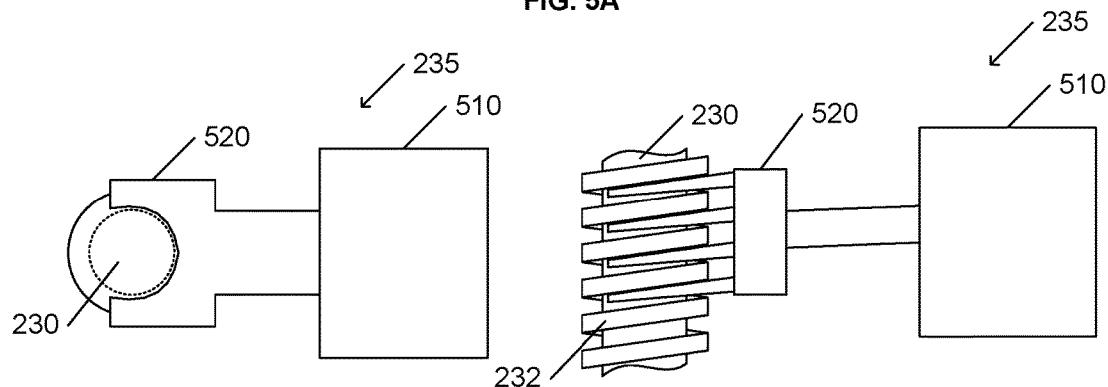

FIGS. 5A-5B each illustrate top and profile views of an example coupling mechanism 235 comprising a device 510 that selectively extends (FIG. 5B) and withdraws (FIG. 5A) a receptor 520 to selectively engage and disengage the threaded rod 230. In this example embodiment, the receptor 520 includes one or more tongs 525 that are structured to engage the threads 232 of the threaded rod 230. Other means of selectively engaging the threads 232 of the threaded rod 230 will be evident to one of skill in the art, include split nuts and the like. Although not illustrated in FIGS. 5A-5B, the threads 232 of the threaded rod 230 are preferably trapezoidal in shape to facilitate the engagement of the tongs 525 or the internal threads of a split nut.

Figure 6:
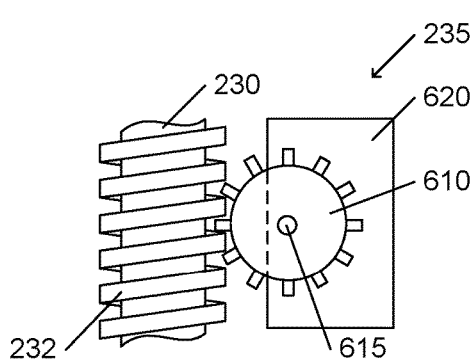
FIG. 6 illustrates an example rack and pinion coupling mechanism using aspects of this invention.

FIG. 6 illustrates another example embodiment of a coupling mechanism 235 that uses a rack and pinion arrangement to selectively engage and disengage the threaded rod 230. The axle 615 of the pinion 610 is attached to a coupling mechanism 620 that is attached to the spacecraft. In a simple embodiment, the coupling mechanism 620 selectively inhibits or releases the rotation of the pinion 610, such as a controlled brake. When the rotation of the pinion 610 is released, the threaded rod 230 is free to turn without exerting any lateral forces on the axle 615 of the pinion 610. When the rotation of the pinion 610 is inhibited, the rotation of the threaded rod 230 exerts a vertical force on the pinion 610, causing the mechanism 620, and the spacecraft to move vertically, either up or down depending on the direction of the rotation of the threaded rod 230.

Figure 7:
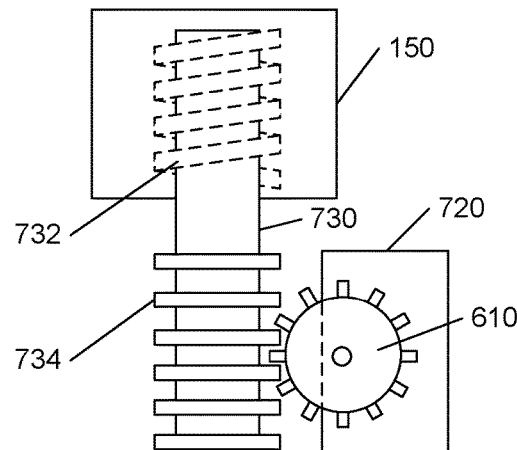
FIG. 7 illustrates another example embodiment of a coupling mechanism using aspects of this invention.

FIG. 7 illustrates an alternative embodiment wherein the threaded rod 730 includes a conventional helical thread 732 to screw into the terminator component 150, and a series of individual horizontal threads 734, or slots below the terminator component 150. In such an embodiment, the coupling mechanism 720 includes a motor (not illustrated) that serves as an actuator that rotates the pinion 610, causing the spacecraft to travel along the slots of the threaded rod 730; and the rotation of the threaded rod 730 by the actuator (240 of FIG. 2) is only used to attach or release the terminator component 150. That is, in this embodiment two independent actuators are used: an actuator 240 that controls the preloading (the 'securing' actuator), and an actuator 720 (the 'locating' actuator) that controls the travel of the spacecraft along the threaded rod 730.

In this embodiment, the actuator 720 controls the engagement and disengagement of the coupling mechanism 610, as well as the travel along the treaded rod 730. As the spacecraft is added to the stack, the actuator 720 rotates the pinion 610, which exerts a vertical force on (engages) the threaded rod 730. When the spacecraft is on the stack, the actuator 720 removes the rotation force on the pinion 610, thereby removing the vertical force on (disengages) the threaded rod 730, allowing the threaded rod 730 to be rotated by the actuator 240.

Optionally, the actuators 720 of the spacecraft on the stack may be engaged to reapply the vertical force on the threaded rod after the threaded rod 230 applies the preload to the stack, to further enhance the rigidity of the stack.

One of skill in the art will recognize that the rod 730 may comprise a hollow outer cylinder that includes the threads 834 and slots for engagement by the actuator 720, and a concentric separate rod that extends from the actuator 240 to the threaded end 732 that screws into the terminal component 150. In this manner, the rotation of the threaded rod 730 will be independent of the vertical forces placed on the outer cylinder by the pinion 610.

One of skill in the art will also recognize that different features of this invention may be combined. For example, the coupling mechanism 620 of FIG. 6 may also include a motor that rotates the pinion 610, to be used in conjunction with, or independent of, the rotation of the threaded rod 230.

Figure 8A:
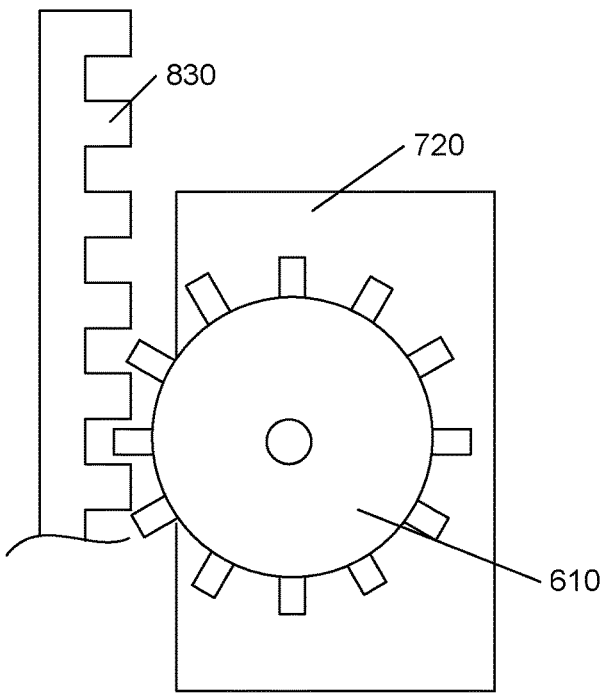
FIGS. 8A-8B illustrate another example embodiment using aspects of this invention.
Figure 8B:
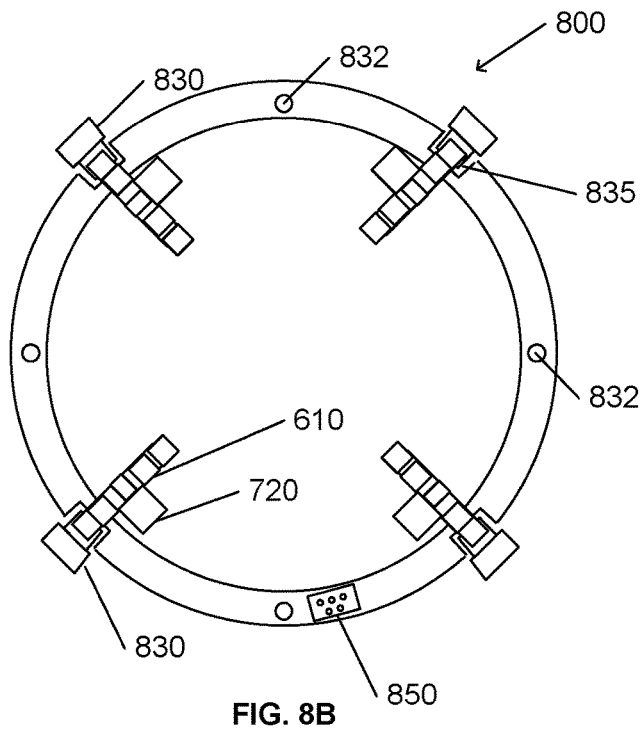

FIGS. 8A-8B illustrate another alternative embodiment wherein the movement along the rods is provided by motorized mechanisms in each spacecraft. As in FIG. 7, in FIG. 8A, a pinion 610 is driven by an actuator 720, but in this embodiment, the rod is a 'rack' 830 upon which the pinion 610 travels.

As illustrated in FIG. 8B, additional rods 832 may be used to align the spacecraft 800 as it travels along the racks 830. In this embodiment, the rods 832 may be smooth in the region of spacecraft locations, with threads that engage the terminal component 150 (not shown).

In some embodiments, as illustrated in FIG. 8B, the rods 830 may be external to the spacecraft, rather than in channels (330 of FIG. 3) within the spacecraft. In some embodiments, the channels of the spacecraft could be "C" channels 835 within which the rods 830 are situated. In some embodiments, the rods 830 may be affixed to the fairing 185 of the launch vehicle.

Figure 9A:
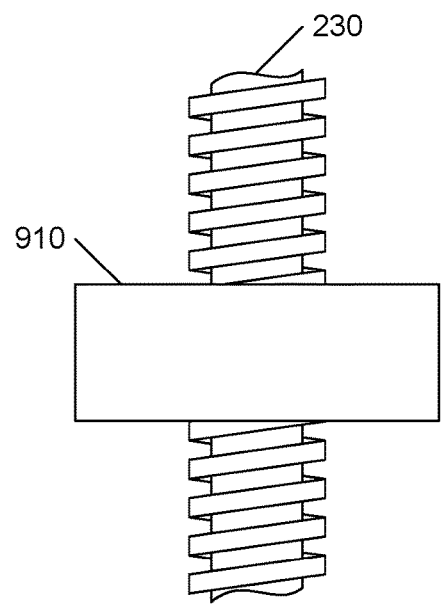
FIGS. 9A-9B illustrate another example embodiment using aspects of this invention.
Figure 9B:
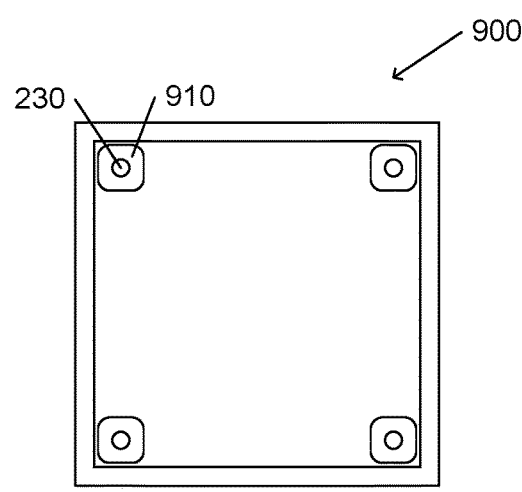

FIGS. 9A-9B illustrated another example embodiment wherein each spacecraft 900 includes a plurality of motors 910 that propel each spacecraft along the threaded rods 230. The axis of the motors 910 are concentric about their corresponding threaded rods 230, and the rotor of each motor 910 includes threads that engage the threaded rods 230. In this manner, a rotation of the rotor causes the motor 910, and the attached spacecraft 900, to travel along the threaded rod 230.

If the threaded rods 230 are used to secure the terminal component 150 via a rotation of each threaded rod, the motors 910 will include a coupling mechanism that selectively engages and disengages the threaded rod to enable rotation of the threaded rod. Alternatively, the terminal component may include a motor 910 that secures the terminal component to the stack.

One of skill in the art will recognize that the spacecraft will include a means of communicating with the launch vehicle (or launch control), and in some instances, may include a means of communicating with the other spacecraft in the stack. In the pre-flight stage, this communication may be via external ports on each spacecraft, but during and after launch, the stack of satellites must operate as a cohesive unit, if for no other reason than synchronizing the discharge of the satellites from the stack.

In embodiments of this invention, each spacecraft includes one or more ports 850 at both the 'top' and 'bottom' surfaces that contact the spacecraft above and below it on the stack, respectively. The ports on the lowermost spacecraft on the stack are coupled to ports on the baseplate, which preferably includes a controller that monitors and reports the status of each satellite to launch control, and controls the discharge of each satellite from the stack. Alternatively, the lowermost spacecraft may be configured to perform this control function.

The ports are preferably situated near the channels that contain the threaded rods 230, to assure connectivity between the ports. These ports should be self-aligning, such that locating the spacecraft on the stack, or on the baseplate, automatically provides connectivity. These ports may provide the communication of other-than-electrical elements, such as liquids or gasses, between and among the spacecraft.

Each spacecraft may also be configured to determine, and optionally report, its location along the rods. Such determination may be made, for example, to distinguish between the spacecraft actually contacting the lower spacecraft or baseplate and the spacecraft encountering unexpected resistance (binding) as it travels along the rod. The location along the rod may also be used during the deployment of each satellite, to determine and/or control the velocity at which the spacecraft is deployed. In some embodiments, the location of the spacecraft may be used to synchronize or activate an operation of the launch vehicle, an operation of the controller that deploys the spacecraft, or an operation of the spacecraft itself, such as a determination of ignition of jets on the spacecraft.

In a simple embodiment, if the spacecraft is moved along the rod via a pinion or other gear arrangement, the number of rotations of the gear from an initial starting location may be used to determine how far the spacecraft has traveled along the rod.

In a more complex embodiment, the rod may include optical or mechanical markings that delineate locations along the rod, and the spacecraft may include an optical or mechanical detector, or both, that reads and decodes the markings. For example, the threads on the rod may include 'flats', and the spacecraft may include a cam arrangement that engages a counter as each flat is encountered. Electronic location detection techniques may also be used, wherein at different locations along the rod, a different electrical signal is received by a detector in the spacecraft; or, the spacecraft emits a signal and a controller in the baseplate determines the location of the spacecraft based on propagation characteristics of the rod.

A combination of techniques may also be used. For example, the rod may include visual markings at fixed intervals, with mechanical features that enable determining the location relative to the visual markers for a finer location determination.

The foregoing merely illustrates the principles of the invention. It will thus be appreciated that those skilled in the art will be able to devise various arrangements which, although not explicitly described or shown herein, embody the principles of the invention and are thus within its spirit and scope.

For example, although the structure of the rods has been disclosed as a solid rod with threads, one of skill in the art will recognize that alternative structures may be used. A hollow rod, for example, may provide a higher specific stiffness, or a given stiffness with less mass, than a solid rod. A hollow rod may also provide lower stress and wear on the actuators and/or higher rotational rates.

Although a rod with grooves is preferred for locating the spacecraft on the stack, one of skill in the art will recognize that a smooth rod with a helical screw on the end for coupling with the terminal element may be used if the spacecraft is equipped with a coupling mechanism that can provide sufficient surface friction to enable the spacecraft to travel along the smooth rod when the coupling mechanism is engaged, such as a wheel with a rubber perimeter in place of the aforementioned pinion.

One of skill in the art will also recognize that the baseplate that is attached to the launch vehicle may be incorporated within the lowermost satellite on the stack. In like manner, the terminator component may be incorporated within the uppermost satellite on the stack. In such an embodiment, the coupling mechanism of the uppermost satellite may serve as the terminator component.

Although this invention is presented as a means for achieving volume efficiency by standardizing the size of the satellites 220 to fill the available volume more efficiently than conventional multiple-payload spacecraft, the principles of this invention may be applied for other standard configurations to address unique requirements. For example, most satellites include solar panels that are 'unfolded' when the satellite is deployed, and this unfolding may include multiple hinged elements. This unfolding presents design challenges, including, for example, assuring that the satellite has an internal energy supply to power the unfolding apparatus until the panels are deployed to generate electricity. Additionally, the satellite could be totally disabled if there is a mechanical or electrical malfunction that affects the unfolding process.

Figure 10:
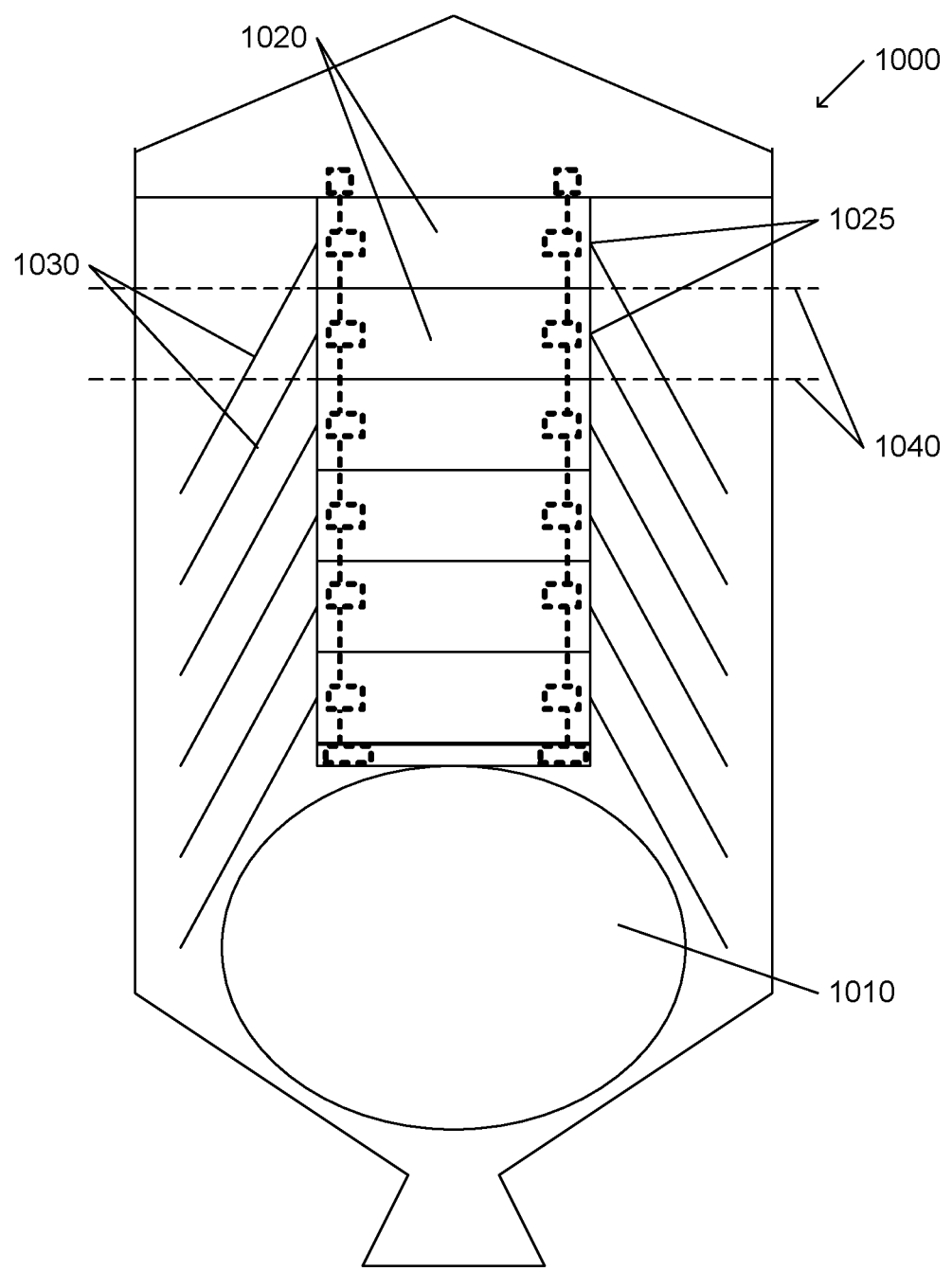
FIG. 10 illustrates another example embodiment using aspects of this invention.

FIG. 10 illustrates an example embodiment 100 wherein the solar panels 1030 are not folded, but are simply hinged 1025 to the satellites 1020. Multiple (typically 4) panels 1030 may be situated about the perimeter of the satellites 1020. Conventionally, the allocated volume allocated to a spacecraft is bounded by the planes 1040 that are defined by the upper and lower surfaces of the satellite 1020. In the embodiment of FIG. 10, however, the solar panels 1030 extend beyond the plane 1040 of the bottom surface of the satellite 1020, into the volume that is conventionally allocated to the lower satellite, or group of satellites, or the volume adjacent the fuel tank 1010.

Even though the solar panels 1030 will typically need to be deployed along a common plane that faces the sun, this deployment only requires the rotation of the solar panels 1030 about the hinge 1025 that couples it to the spacecraft 1020. If the hinge 1025 is spring-loaded, and latched in a tensioned state, this deployment can be accomplished by a mere release of the latch when the satellite 1020 is released from the spacecraft 1000.

Although the satellites 1020 are illustrated as being similar to each other, as would be common in a 'constellation' of satellites, one of skill in the art will recognize that different sized satellites may be included in the same spacecraft 1000. For example, the uppermost satellites may be satellites that do not have these hinged solar panel, and accordingly may be sized to occupy more of the volume of the spacecraft 1000 within the conventional space defined by the planes 1040 between each spacecraft. In like manner, if the spacecraft 1000 does not allow the solar panels 1030 to extend into the volume allocated to the fuel tank 1010, the lowermost satellites may be satellites without solar panels 1030.

These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed devices or portions thereof may be combined together or separated into further portions unless specifically stated otherwise;
f) no specific sequence of acts is intended to be required unless specifically indicated; and
g) the term "plurality of" an element includes two or more of the claimed element, and does not imply any particular range of number of elements; that is, a plurality of elements can be as few as two elements, and can include an immeasurable number of elements.

We claim:

1. A spacecraft deployment system comprising:
a baseplate that is configured to attach to a launch vehicle;
at least one rod that extends orthogonal to a surface of the baseplate;
a plurality of spacecraft coupled to the baseplate via the at least one rod; and
a terminator component;
wherein:
each of the spacecraft includes at least one channel through which the at least one rod traverses;
each of the spacecraft includes at least one coupling mechanism that enables the spacecraft to selectively engage and disengage the at least one rod;
the system includes:
at least one locating actuator that causes each spacecraft of the plurality of spacecraft to travel along the at least one rod when the coupling mechanism is engaged, to situate the spacecraft in a stack atop the baseplate and any intervening spacecraft; and
at least one securing actuator that causes the plurality of rods to engage the terminator component to apply a preload to the plurality of spacecraft to securely couple the stack of spacecraft to the baseplate.

2. The system of claim 1, wherein:
the at least one rod comprises a threaded rod;
the locating actuator and the securing actuator are a single actuator;
the single actuator causes the threaded rod to rotate;
the coupling mechanism of each spacecraft:
causes the spacecraft to move along the threaded rod when engaged; and
allows the threaded rod to freely rotate when disengaged.

3. The system of claim 1, wherein
the at least one rod is one of a plurality of rods;
each spacecraft includes a plurality of coupling mechanisms, each coupling mechanism enabling the spacecraft to selectively engage or disengage a corresponding rod;
the system includes a plurality of locating actuators situated on the baseplate, each locating actuator being coupled to each rod of the plurality of rods;
each locating actuator causes the corresponding rod to rotate; and
the coupling mechanisms of each spacecraft:
cause the spacecraft to travel along the rods when engaged; and
allows the rods to freely rotate when disengaged.

4. The system of claim 1, wherein
the at least one rod comprises a rod with grooves; and
the locating actuator of at least one spacecraft comprises a motor-driven gear that engages the grooves to cause the spacecraft to travel along the at least one rod when engaged.

5. The system of claim 1, wherein the at least one spacecraft comprises the at least one locating actuator that causes the spacecraft to travel along the rod when the coupling mechanism is engaged, to situate the spacecraft in a stack atop the baseplate and any intervening spacecraft.

6. The system of claim 1, wherein the rod and the coupling mechanism of at least one spacecraft comprises a rack and pinion arrangement, wherein the pinion selectively engages or disengages the rack.

7. The system of claim 1, wherein the rod and the coupling mechanism of each spacecraft comprises a nut and bolt arrangement, wherein the nut selectively engages or disengages the bolt.

8. The system of claim 1, wherein the coupling mechanism of only one spacecraft is engaged when the locating actuator is enabled.

9. The system of claim 1, wherein the terminator component is a nosecone of the launch vehicle.

10. The system of claim 1, wherein the spacecraft includes a location detector that detects a location of the spacecraft along the plurality of rods.

11. The system of claim 10, wherein the location of the spacecraft is used to initiate an action by the spacecraft deployment system.

12. The system of claim 1, wherein each spacecraft includes one or more ports that are configured to interface with a corresponding port on an adjacent spacecraft on the stack.

13. The system of claim 12, wherein the baseplate includes one or more ports that are configured to interface with a corresponding port on a lowermost spacecraft on the stack.

14. The system of claim 1, wherein at least one of the plurality of rods is hollow.

15. The system of claim 1, wherein the baseplate is included in a lowermost satellite in the stack.

16. The system of claim 1, wherein the at least one coupling mechanism of an uppermost satellite in the stack form the terminator component.

17. The system of claim 1, wherein at least one spacecraft includes external panels that extend below a plane parallel to a bottom surface of the at least one spacecraft.

18. The system of claim 17, wherein the external panels extend below a plurality of planes, each parallel to a bottom surface of other spacecraft.

19. The system of claim 1, wherein the baseplate is situated above a final stage of the spacecraft, and the terminal component is situated in a nosecone of the spacecraft, and wherein the final stage includes a lip within which panels of fairing are situated, and the nosecone includes a corresponding lip, such that drawing down the terminal component in the nosecone captures the panels within the lip of the nosecone.

20. A method of spacecraft deployment comprising:
providing a baseplate with at least one rod extending orthogonal to a surface of the baseplate;
providing a plurality of spacecraft, wherein:
  each spacecraft includes at least one channel through which the at least one rods traverses;
  each spacecraft includes at least one coupling mechanism for selectively engaging or disengaging the at least one rod;
creating a stack of spacecraft atop the baseplate by, for each spacecraft:
  situating the at least one rod into the at least one channel of the spacecraft,
  engaging the at least one coupling mechanism of the spacecraft,
  disengaging the at least one coupling mechanism of any intervening spacecraft atop the baseplate, and
  enabling a locating actuator to cause the spacecraft to move along the at least one rod toward the baseplate via the at least one coupling mechanism;
enabling a securing actuator to preload the stack of spacecraft by securely coupling the at least one rod to a terminator component while all of the coupling mechanisms of the plurality of spacecraft are disengaged; and
attaching the baseplate to a launch vehicle.

21. The method of claim 20, comprising:
launching the launch vehicle;
decoupling the terminator component;
deploying each of the spacecraft by:
  engaging the at least one coupling mechanism of the spacecraft to the at least one rod;
  disengaging the at least one coupling mechanism of all other spacecraft in the stack of spacecraft; and
  enabling the locating actuator to cause the spacecraft to move along the at least one rod away from the baseplate via the engaged coupling mechanism.

22. The method of claim 20, wherein the locating actuator and the securing actuator are a single actuator.

23. The method of claim 20, wherein the at least one rod is a threaded rod, and wherein the locating actuator rotates the threaded rod to cause the spacecraft to move along the threaded rod.

24. The method of claim 20, wherein the at least one rod is a threaded rod, and wherein the securing actuator rotates the threaded rod to preload the stack of spacecraft.

25. The method of claim 20, wherein:
the locating actuator and the securing actuator are a single actuator;
the at least one rod is a threaded rod, and
the single actuator rotates the threaded rod to cause the spacecraft to move along the threaded rod, and subsequently to preload the stack of spacecraft.

* * * * *